UNITED STATES PATENT OFFICE 2,485,281

PLASTICIZED RESIN COMPOSITIONS

James T. Gregory, Cuyahoga Falls, Ohio, assignor to The B. F. Goodrich Company, New York, N. Y., a corporation of New York No Drawing. Application June 18, 1947,
Serial No. 755,475

7 Claims. (Cl. 260—31.8)

This invention relates to plasticized resin compositions and pertains more particularly to compositions comprising a vinyl resin such as polyvinyl chloride plasticized with an ester of gamma-keto pimelic acid.

It is known that gamma-keto pimelic acid may be prepared by means of a Perkins Synthesis, using as starting materials furfural, acetic anhydride, and potassium acetate. Beta-furylacrylic acid is formed which undergoes ring cleavage in the presence of water to form gamma-keto pimelic acid. Esters of the acid thus formed may be readily prepared in good yields by a simple esterification reaction.

I have now discovered that esters of gamma-keto pimelic acid possessing the formula:

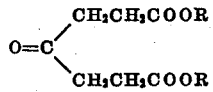

wherein R is the organic radical of a monohydric alcohol, are excellent plasticizers for polyvinyl chloride and similar vinyl resins. I have found that such esters possess an unusually high affinity for the resin; that they are easily incorporated into the resin at elevated temperatures, which, however, are considerably lower than those ordinarily required, to give a soft, plastic, easily-processed composition; that they are retained by the resin under a wide variety of service conditions and for long periods of time; and that they impart to the resin a number of useful properties, one of the most outstanding of which is the ability to remain flexible and elastic at extreme low temperatures.

Compositions comprising a vinyl resin and such a plasticizer, with which this invention is concerned, are unique among plasticized vinyl resin compositions. They are processable at relatively low temperatures, in the range of 220 to 240° F., yet the composition is flexible at temperatures as low or lower than —60° C. This combination of properties is not found in vinyl resins plasticized with known plasticizers; rather when using such plasticizers, it has been observed that compositions which are flexible at temperatures lower than about —30° C. generally require processing temperatures above 300° F. and compositions which process below 300° F. are generally brittle at temperatures below about —30° C.

The compositions of this invention are prepared in the usual manner by admixing the plasticizer with the resin on a mixing mill or in an internal mixer, or by adding the plasticizer to a latex of the resin, or to an emulsion of the resin-forming monomer prior to polymerization to form the resin, or to a solution of the resin in a solvent, or by any other desired method, it being understood that any of the various methods of incorporating a plasticizer in a resin is applicable to the plasticizers herein set forth. The amount of plasticizer used in forming the composition is not critical and may be varied widely. Compositions containing from 10 parts or even less to 150 parts or more of the plasticizer for each 100 parts of the resin all possess the advantages hereinabove described, but the use of 20 to 80 parts of plasticizer for each 100 parts of resin is preferred for most purposes.

The plasticizer used in this invention may be any ester of gamma-keto pimelic acid with any monohydric alcohol which may be either saturated or unsaturated, primary, secondary or tertiary, substituted or unsubstituted or aliphatic, aromatic or heterocyclic in nature. Among such alcohols are: primary alkyl alcohols such as methyl alcohol, ethyl alcohol, propyl alcohol, butyl alcohol, amyl alcohol, hexyl alcohol, heptyl alcohol, octyl alcohol, nonyl alcohol, decyl alcohol, undecyl alcohol, dodecyl alcohol, tetradecyl alcohol, cetyl alcohol, octadecyl alcohol, and the like;

Secondary alkyl alcohols such as isopropyl alcohol, secondary butyl alcohol, secondary amyl alcohol, secondary hexyl alcohol, secondary octyl alcohol, secondary nonyl alcohol and the like;

Tertiary alkyl alcohols such as tertiary butyl alcohol, tertiary amyl alcohol, tertiary butyl carbinol, tertiary amyl carbinol, pinacolyl, and the like;

Aromatic alcohols such as benzyl alcohol, methylphenylcarbinol, phenylmethyl alcohol and the like;

Alicyclic alcohols such as cyclohexanol, cyclobutylcarbinol, cyclopentanol, and the like;

Heterocyclic alcohols such as furfuryl and tetrahydrofurfuryl alcohols and the like;

Unsaturated aliphatic alcohols such as allyl alcohol, methallyl alcohol, crotyl alcohol, propargyl alcohol, and the like;

Substituted alcohols such as ethoxy ethyl alcohol, ethylene chlorohydrin, cyanohydrin, 2-bromoethanol, and the like.

The preferred esters are those obtained by esterifying gamma-keto pimelic acid with an alkyl alcohol, especially those containing from 4 to 12 carbon atoms.

Although the two monohydric alcohol radicals in the ester are ordinarily the same it is possible to prepare a compound in which the alcohol radicals are different, as by a partial exchange reaction between the ester and a higher boiling alcohol.

Among the materials which may be plasticized with gamma-keto pimelic acid esters are polyvinyl chloride and similar vinyl resins. Among these vinyl resins are included polyvinyl bromide, polyvinyl fluoride and copolymers of vinyl chloride, bromide or fluoride with one or more other polymerizable unsaturated compounds containing a single olefinic double bond such as vinyl acetate, vinylidene chloride, vinylidene bromide, styrene, acrylonitrile, methyl acrylate, ethyl acrylate, methyl methacrylate, methyl chloroacrylate, ethyl cyanoacrylate, diethyl fumarate, diethyl chloromaleate, isobutyl crotonate, vinyl isobutyl ether, vinyl methyl ketone, vinyl benzoate, vinyl butyrate, vinyl furane, vinyl pyridine, dichlorostyrene, isobutylene, ethylene and the like. All such polymeric materials are polymers of vinyl halides and are preferably used in preparing the plasticized resins of this invention, especially when the polymer contains a predominant amount of polymerized vinyl halide.

Other thermoplastic resins are similar to polyvinyl chloride in their ability to be plasticized with gamma-keto pimelic acid esters and may also be used. Among these are polymers of vinyl acetate, vinyl benzoate and other vinyl esters and copolymers thereof with one another or with any of the other monomers mentioned in the preceding paragraph; polymers of methyl acrylate, ethyl acrylate and other esters of acrylic or substituted acrylic acids and copolymers thereof with one another or with any of the other monomers mentioned in the preceding paragraph; polymers of vinylidene chloride and copolymers thereof with the other monomers mentioned in the preceding paragraph; polymers and copolymers of other vinyl compounds such as vinyl ether, vinyl ketones, etc. with each other or with any of the other monomers mentioned above; polymers of styrene and substituted styrenes and copolymers thereof with each other or with any of the other monomers mentioned above, polymers of acrylonitrile and substituted acrylic nitriles and copolymers thereof with each other or with any of the other monomers mentioned above, polyethylene, polyvinyl alcohol, polyvinyl acetals and the like. In short, any of the thermoplastic resins derived by the polymerization of monomeric materials containing a single olefinic bond may be used in this invention.

In the following specific examples, esters of gamma-keto pimelic acid are used to plasticize polyvinyl chloride, it being understood that generally equivalent effects are secured when other vinyl chloride polymers are substituted for polyvinyl chloride. Moreover, the gamma-keto pimelic acid esters function efficiently as plasticizers when the polyvinyl chloride is replaced by the other above-described thermoplastic resins. In the examples, all parts are by weight.

*Example I*

150 parts of powdered polyvinyl chloride and 100 parts of the di-2-ethylhexyl ester of gamma-keto pimelic acid

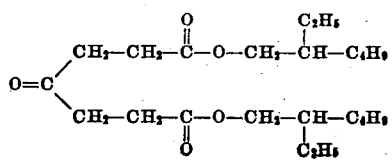

are mixed together in a container to form a dough-like mix. This mixture is then placed on a two-roll mixing mill at about 210° F. and its behavior observed as the temperature of the mill rises. When a temperature of 230° F. is reached, the plasticizer and the polyvinyl chloride are compatible and the stock may be cut without tearing a ragged edge. At this point the stock has no "nerve," that is, it does not shrink when a section is cut. These qualities indicate that the plasticizer is extremely compatible with the resin and that the plasticized composition may be processed easily at a temperature of 230° F. After plasticization is complete, the stock is sheeted off the mill and molded into a sheet of approximately 0.020 inch thickness. The sheet is allowed to cool to room temperature, whereupon it is quite soft and flexible and does not feel greasy to the touch (which indicates that the plasticizer has not "bled" from the resin) even after standing in air for a period of two weeks. Another sample is tested for low-temperature flexibility and it is found that the composition is flexible at temperatures as low as −65° C. Other samples are tested for tensile strength, elongation, resistance to tear, electrical resistivity, and in each case it is found that the composition is superior to polyvinyl chloride compositions containing the same percentage of di-2-ethylhexyl pimelate (a compound not containing the keto group), as a plasticizer. Furthermore, the gamma-keto pimelic acid ester also exhibits substantially less heat loss based on the composition and on the plasticizer than the corresponding ester of pimelic acid.

*Examples II and III*

The procedure of Example I is repeated using other esters of gamma-keto pimelic acid. The results obtained are generally the same as those described in Example I, differences in specific values as to milling temperature and low temperature flexibility (which is expresed as "Brittleness temperature," the highest temperature at which the composition is brittle rather than flexible in a standard test) being as follows:

| Example | Plasticizer | Milling Temperature °F. | Brittleness Temperature °C. |
|---|---|---|---|
| II | di-n-hexyl gamma-keto pimelate | 220 | −64 |
| III | dibutyl gamma-keto pimelate | 220 | −60 |

Similar improvements in milling temperature and low temperature flexibility properties are obtained when the other esters of gamma-keto pimelic acid are used as plasticizers for polyvinyl chloride and the other materials herein listed.

In addition to the resin and the plasticizer, the compositions of this invention may also contain pigments, fillers, colors, and solvents. Either a single plasticizer may be used or a mixture of one or more of the plasticizers of this invention may be used together with other plasticizers known to the art. These and other variations in compounding of resin formulations using the plasticizers of this invention, including variations in proportions, will be apparent to those skilled in the art and are within the spirit and scope of the appended claims.

I claim:

1. A plasticized resin composition comprising a thermoplastic polymer of a vinyl halide and, as a plasticizer therefor, an ester of the formula

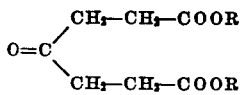

wherein R is the organic radical of a monohydric alcohol.

2. A plasticized resin composition according to claim 1 wherein the thermoplastic polymer is a polymer of vinyl chloride.

3. A plasticized resin composition comprising a thermoplastic polymer of vinyl chloride, and as a plasticizer therefor, an ester of the formula

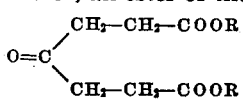

wherein R is an aliphatic radical.

4. A plasticized resin composition comprising a thermoplastic polymer of vinyl chloride, and as a plasticizer therefor, an ester of the formula

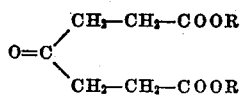

wherein R is an alkyl radical.

5. A plasticized resin composition comprising polyvinyl chloride, and as a plasticizer therefor, di-2-ethyl-hexyl-gamma-keto pimelate.

6. A plasticized resin composition comprising polyvinyl chloride, and as a plasticizer therefor, di-n-hexyl-gamma-keto pimelate.

7. A plasticized resin composition comprising polyvinyl chloride, and as a plasticizer therefor, di-butyl-gamma-keto pimelate.

JAMES T. GREGORY.

REFERENCES CITED

The following references are of record in the file of this patent:

UNITED STATES PATENTS

| Number | Name | Date |
|---|---|---|
| 2,218,439 | Rothrock | Oct. 15, 1940 |